United States Patent
Xu et al.

(10) Patent No.: US 12,478,946 B2
(45) Date of Patent: Nov. 25, 2025

(54) CARRIER FOR MERCURY ADSORBENT AND METHOD FOR PREPARING THE CARRIER

(71) Applicant: Xi'an Sunward Aeromat Co., Ltd., Xi'an (CN)

(72) Inventors: Longlong Xu, Xi'an (CN); Zhenguo Zhang, Xi'an (CN); Shaodan Zhao, Xi'an (CN); Di Huang, Xi'an (CN); Wenyou Wang, Xi'an (CN); Chunzhen Xue, Xi'an (CN); Ke Lyu, Xi'an (CN); Yuan Luo, Xi'an (CN)

(73) Assignee: XI'AN SUNWARD AEROMAT CO., LTD., Xi'an (CN)

( * ) Notice: Subject to any disclaimer, the term of this patent is extended or adjusted under 35 U.S.C. 154(b) by 613 days.

(21) Appl. No.: 17/939,936

(22) Filed: Sep. 7, 2022

(65) Prior Publication Data
US 2023/0030866 A1    Feb. 2, 2023

Related U.S. Application Data

(63) Continuation-in-part of application No. PCT/CN2021/125031, filed on Oct. 20, 2021.

(30) Foreign Application Priority Data

Jul. 21, 2021    (CN) .......................... 202110823277.4

(51) Int. Cl.

| | | |
|---|---|---|
| *B01J 21/04* | (2006.01) | |
| *B01D 53/64* | (2006.01) | |
| *B01D 53/81* | (2006.01) | |
| *B01J 20/02* | (2006.01) | |
| *B01J 20/16* | (2006.01) | |
| *B01J 20/30* | (2006.01) | |
| *B01J 21/08* | (2006.01) | |
| *B01J 21/12* | (2006.01) | |
| *B01J 37/00* | (2006.01) | |

(52) U.S. Cl.
CPC ........... *B01J 20/16* (2013.01); *B01J 20/0266* (2013.01); *B01J 20/3085* (2013.01); *B01D 53/64* (2013.01); *B01D 53/81* (2013.01); *B01D 2253/1128* (2013.01); *B01D 2257/602* (2013.01)

(58) Field of Classification Search
CPC ... B01J 21/04; B01J 21/08; B01J 21/12; B01J 37/00; B01J 20/0266; B01J 20/16; B01J 20/3085; B01D 53/64; B01D 53/81; B01D 2253/1128; B01D 2257/602
USPC ......................................... 502/355, 415, 439
See application file for complete search history.

(56) References Cited

U.S. PATENT DOCUMENTS

| | | | |
|---|---|---|---|
| 4,508,841 A * | 4/1985 | Onuma .................... | B01J 21/04 502/355 |
| 9,440,222 B2 * | 9/2016 | Hasegawa ................. | B01J 21/12 |
| 9,744,522 B2 * | 8/2017 | Hasegawa .............. | B01J 35/635 |
| 2005/0245394 A1 * | 11/2005 | Dahar .................. | B01J 37/0045 502/439 |
| 2009/0270249 A1 * | 10/2009 | Dahar ..................... | C01F 7/441 502/439 |

* cited by examiner

*Primary Examiner* — Cam N. Nguyen
(74) *Attorney, Agent, or Firm* — MATTHIAS SCHOLL P.C.; Matthias Scholl

(57) ABSTRACT

A preparation method for the carrier, includes: 1) mixing hydrated alumina with an organic acid to obtain a mixture A; and 2) adding tetraalkylsiloxane to the mixture A, thus obtaining a mixture B; stirring the mixture B in a closed condition; spraying atomized water into the mixture B; and stirring to yield the carrier.

8 Claims, No Drawings

CARRIER FOR MERCURY ADSORBENT AND METHOD FOR PREPARING THE CARRIER

CROSS-REFERENCE TO RELATED APPLICATIONS

This application is a continuation-in-part of International Patent Application No. PCT/CN2021/125031 with an international filing date of Oct. 20, 2021, designating the United States, now pending, and further claims foreign priority benefits to Chinese Patent Application No. 202110823277.4 filed Jul. 21, 2021. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, MA 02142.

BACKGROUND

The disclosure relates to a carrier for a mercury adsorbent and a method for preparing the carrier.

Mercury is present in trace amounts in most natural gas fields. Mercury is volatile, toxic, and corrosive, so it is unfriendly to environment and process equipment, and threatens the safe exploration and utilization of natural gas.

Recent research about mercury removal from natural gas has focused on the development of efficient mercury adsorbents. Metal sulfides, for example, copper-based sulfides, are efficient in mercury removal. In the mercury removal process, mercury)($Hg^0$ reacts with copper-based sulfides and to yield mercury sulfide (HgS). The mercury removal can be expressed through the following chemical reaction:

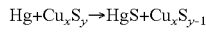

$$Hg + Cu_xS_y \rightarrow HgS + Cu_xS_{y-1}$$

Currently, more attention is paid to the study on optimization of adsorption properties of copper-based sulfides and their loading processes, while the optimization of the carriers of the copper-based sulfides is neglected. In fact, the carriers play a vital role in removal of mercury. Hydrated alumina is often used as a carrier but causes a decrease in adsorption capacity of mercury adsorbents during use and storage.

SUMMARY

The first objective of the disclosure is to provide a method for preparing a carrier for a mercury adsorbent. In the disclosure, hydrated alumina is used as a basic material and optimized using an acid and a silicone additive to yield an efficient mercury adsorbent.

The second objective of the disclosure is to provide the carrier for the mercury adsorbent.

The preparation method for the carrier, comprises:
1) mixing hydrated alumina with an organic acid to obtain a mixture A; and
2) adding tetraalkylsiloxane to the mixture A, thus obtaining a mixture B; stirring the mixture B in a closed condition; spraying atomized water into the mixture B; and stirring to yield the carrier.

In a class of this embodiment, in 1), hydrated alumina is mixed with the organic acid at −10° C. to 40° C.

In a class of this embodiment, in 1), the organic acid is 1%-10% by mass of the hydrated alumina.

In a class of this embodiment, in 1), the organic acid is 6% by mass of the hydrated alumina.

In a class of this embodiment, in 1), the organic acid is oxalic acid, ethylenediaminetetraacetic acid, or citric acid.

In a class of this embodiment, in 2), tetraalkylsiloxane is 3%-15% by mass of the hydrated alumina.

In a class of this embodiment, tetraalkylsiloxane is tetramethylsiloxane or tetraethoxysilane.

In a class of this embodiment, in 2), the atomized water is 3-8 times tetraalkylsiloxane by mass.

In a class of this embodiment, in 2), the atomized water is added and stirred for 1-24 h.

The disclosure also provides a carrier for a mercury adsorbent prepared by the method.

The following advantages are associated with the preparation method of the disclosure:

1. With the same active copper sulfide content in the mercury adsorbent of the disclosure and a conventional adsorbent, the mercury adsorbent comprising the carrier of the disclosure exhibits greater mercury removal ability with at least 10% higher than that of a conventional adsorbent;
2. the mercury adsorbent comprising the carrier can be stored for a long period of time with constant mercury removal rate during use and storage;
3. the preparation method prevents cross-linking of hydrated oxide carriers during mercury removal; the disclosure uses hydrated alumina as a basic material to develop an improved adsorbent for mercury removal; the organic acid is added to inhibit the dehydration of hydrated alumina; a silicone additive, such as tetraalkylsiloxane, is added to facilitate formation of a protective film on the surface of the carriers; the protective film avoids contact between hydrated alumina particles while slowing down the dehydration process;
4. the organic acids comprise groups capable of absorbing mercury, which advances the adsorption process and improves the adsorption ability of the mercury adsorbent; and
5. the method for preparing the carrier is cost-effective and easy to operate.

DETAILED DESCRIPTION

To further illustrate, embodiments detailing a motor controller are described below. It should be noted that the following embodiments are intended to describe and not to limit the disclosure.

A method for preparing a carrier for a mercury adsorbent, comprises:
1. mixing hydrated alumina with an organic acid at −10° C. to 40° C. to obtain a mixture A; the organic acid is 1%-10% by mass of the hydrated alumina; and the organic acid is oxalic acid, ethylenediaminetetraacetic acid, or citric acid; and
2. adding tetraalkylsiloxane accounting for 3%-15% by mass of the hydrated alumina to the mixture A, thus obtaining a mixture B; tetraalkylsiloxane is tetramethylsiloxane or tetraethoxysilane; stirring the mixture B in a closed condition; spraying atomized water into the mixture B; the atomized water is 3-8 times tetraalkylsiloxane by mass; and continue stirring for 1-24 h to yield the carrier.

The method for preparing the carrier is cost-effective and easy to operate.

Comparison Example

Activated alumina powders were purchased from the market and used as a control group.

Example 1

A preparation method for a carrier for a mercury adsorbent, comprises:
1. 100 g of activated alumina powders were mechanically mixed with 1 g of oxalic acid at 40° C. for 10 min to obtain a mixture A;
2. 3 g of tetramethylsiloxane was added to the mixture A to obtain a mixture B; and
3. the mixture B was stirred in a closed condition; 24 g of atomized water was sprayed into the stirred mixture B and stirred for 5 h to yield the carrier.

Example 2

A preparation method for a carrier for a mercury adsorbent, comprises:
1. 100 g of activated alumina powders were mechanically mixed with 5 g of ethylenediaminetetraacetic acid at 30° C. for 20 min to obtain a mixture A;
2. 5 g of tetraethoxysilane was added to the mixture A to obtain a mixture B; and;
3. the mixture B was stirred in a closed condition; 15 g of atomized water was sprayed into the stirred mixture B and stirred for 1 h to yield the carrier.

Example 3

A preparation method for a carrier for a mercury adsorbent, comprises:
1. 100 g of activated alumina powders were mechanically mixed with 10 g of citric acid at 0° C. for 20 min to obtain a mixture A;
2. 10 g of tetraethoxysilane was added to the mixture A to obtain a mixture B; and
3. the mixture B was stirred in a closed condition; 40 g of atomized water was sprayed into the stirred mixture B and stirred for 24 h to yield the carrier.

Example 4

A preparation method for a carrier for a mercury adsorbent, comprises:
1. 100 g of pseudoboehmite was mechanically mixed with 6 g of citric acid at −10° C. for 30 min to obtain a mixture A;
2. 6 g of tetraethoxysilane was added to the mixture A to obtain a mixture B; and
3. the mixture B was stirred in a closed condition; 30 g of atomized water was sprayed into the stirred mixture B and stirred for 12 h to yield the carrier.

Example 5

A preparation method for a carrier for a mercury adsorbent, comprises:
1. 100 g of activated alumina powders were mechanically mixed with 6 g of citric acid at 25° C. for 30 min to obtain a mixture A;
2. 6 g of tetraethoxysilane was added to the mixture A to obtain a mixture B; and
3. the mixture B was stirred in a closed condition; 30 g of atomized water was sprayed into the stirred mixture B and stirred for 12 h to yield the carrier.

The carriers obtained in the comparison example and Examples 1-5 were used to prepare mercury adsorbents comprising 35% metal sulfides. The preparation methods for the mercury adsorbents are related art and hence are not described in detail herein. After storage for 1 day, 3 months, and 6 months, the mercury adsorbents were tested for mercury adsorption performance. The performance testing conditions were detailed as follows: a volume of a mercury adsorbent: 0.1 mL; particle size: 0.25-0.45 mm; pressure: ordinary pressure; reaction temperature: 50° C.; room temperature: 30° C.; gas velocity: $1.5 \times 10^5$ $h^{-1}$; feed gas: a molar ratio of methane to nitrogen was 1:2; and mercury level: 20-25 mg/m³. The volumes of a feed gas and tail gas were measured in accordance with "GB/T16781.2-1997 Natural gas—Determination of mercury—Cold atomic fluorescent spectrophotometry". The mercury level in a tail gas was measured. When the mercury level exceeds 2 mg/m3 three times, it means that the mercury adsorbent reach its maximum saturation capacity. The mercury adsorbents were taken out and measured in accordance with "GB/T17136-1997 Soil quality—Determination of total mercury—Cold atomic absorption spectrophotometry". The results of the experiments are shown in Table 1.

TABLE 1

| Sample No | Mercury adsorption capacity (%) | Mercury adsorption capacity (%) after 3 months | Mercury adsorption capacity (%) after 6 months |
| --- | --- | --- | --- |
| Comparison example | 12.5 | 10.5 | 8.4 |
| Example 1 | 14.1 | 13.9 | 13.5 |
| Example 2 | 14.3 | 14.2 | 14.0 |
| Example 3 | 15.6 | 15.5 | 15.5 |
| Example 4 | 17.1 | 17.1 | 17.0 |
| Example 5 | 16.8 | 16.6 | 16.6 |

Referring to Table 1, the mercury adsorbents of the disclosure exhibit greater ability to absorb mercury with at least 10% higher than that of the related adsorbents. The adsorption capacity of the conventional mercury adsorbents decreases continuously during storage. The adsorption capacity of the mercury adsorbents of the disclosure persists for a long period of time.

Example 6

A preparation method for a carrier for a mercury adsorbent, comprises:
1. hydrated alumina was mechanically mixed with oxalic acid at −10° C. to obtain a mixture A; the amount of oxalic acid was 1% by mass of the hydrated alumina; and
2. tetramethylsiloxane accounting for 3% by mass of the hydrated alumina was added to the mixture A to obtain a mixture B; the mixture B was stirred in a closed condition; atomized water was sprayed into the stirred mixture B and stirred for 1 h to yield the carrier; and the amount of the atomized water was 3 times the mass of tetramethylsiloxane.

Example 7

A preparation method for a carrier for a mercury adsorbent, comprises:
1. hydrated alumina was mechanically mixed with ethylenediaminetetraacetic acid at 20° C. to obtain a mixture A; ethylenediaminetetraacetic acid was 6% by mass of the hydrated alumina; and
2. tetraethoxysilane accounting for 9% by mass of the hydrated alumina was added to the mixture A to obtain a mixture B; the mixture B was stirred in a closed condition; atomized water was sprayed into the stirred mixture B and stirred for 1 h to yield the carrier; and the amount of the atomized water was 5 times the mass of tetramethylsiloxane.

Example 8

A preparation method for a carrier for a mercury adsorbent, comprises:
1. hydrated alumina was mechanically mixed with citric acid at 40° C. to obtain a mixture A; citric acid was 10% of mass of the hydrated alumina; and
2. tetraethoxysilane accounting for 15% by mass of the hydrated alumina was added to the mixture A to obtain a mixture B; the mixture B was stirred in a closed condition; atomized water was sprayed into the stirred mixture B and stirred for 1 h to yield the carrier; and the amount of the atomized water was 8 times the mass of tetramethylsiloxane.

The preparation method prevents cross-linking of hydrated oxide carriers during mercury removal. The contact of the hydrated alumina carrier and metal sulfides leads to severe reduction in the mercury adsorption ability, as compared to the metal sulfides of the same mass. For example, 1 part by mass of copper sulfide can absorb 0.6 part by mass of mercury but absorbs no more than 0.4 part by mass of mercury after loading hydrated alumina carriers. The hydrated alumina carriers are left to stand for a period of time, causing a decrease in mercury adsorption efficiency. The reason why the mercury adsorption decreases is that the hydrated alumina is gradually dehydrated over time and forms crosslinking structure, which leads to changes in volume and structure of the pore in the related adsorbents. The crosslinking structure suppresses the distribution of mercury and tight the structure of copper sulfide. When dehydration occurs, the water is lost but is difficult to overflow inside the related adsorbents, which prevents mercury from contacting copper sulfide. The dehydration eliminates the ability of the related adsorbents to absorb mercury. The disclosure uses hydrated alumina as a basic material to develop an improved adsorbent for mercury removal. The organic acids are added to inhibit the dehydration of hydrated alumina. A silicone additive, such as tetraalkylsiloxane, is added to facilitate formation of a protective film on the surface of the carriers. The protective film avoids the contact between hydrated alumina particles while slowing down the dehydration process. The organic acids comprise groups capable of absorbing mercury, which advances the adsorption process and improves the adsorption ability of the mercury adsorbents.

It will be obvious to those skilled in the art that changes and modifications may be made, and therefore, the aim in the appended claims is to cover all such changes and modifications.

What is claimed is:
1. A method for preparing a carrier for a mercury adsorbent, the method comprising:
  1) Mixing hydrated alumina with an organic acid to obtain a mixture A, wherein the organic acid is ethylenediaminetetraacetic acid; and
  2) Adding tetraalkylsiloxane to the mixture A, thus obtaining a mixture B; stirring the mixture B in a closed condition; spraying atomized water into the mixture B; and stirring to yield the carrier.
2. The method of claim 1, wherein in 1), hydrated alumina is mixed with the organic acid at −10° C. to 40° C.
3. The method of claim 1, wherein in 1), the organic acid is 1%-10% by mass of the hydrated alumina in the mixture A.
4. The method of claim 3, wherein the organic acid is 6% by mass of the hydrated alumina in the mixture A.
5. The method of claim 1, wherein in 2), the tetraalkylsiloxane is 3%-15% by mass of the hydrated alumina.
6. The method of claim 1, wherein the tetraalkylsiloxane is tetramethylsiloxane or tetraethoxysilane.
7. The method of claim 1, wherein the atomized water is 3-8 times tetraalkylsiloxane by mass.
8. The method of claim 1, wherein in 2), the atomized water is added and stirred for 1-24 h.

* * * * *